Jan. 8, 1963 R. N. CLOSE 3,072,856
SWEEP RECOVERY AND ALTITUDE COMPENSATION CIRCUIT
Filed April 15, 1958 3 Sheets-Sheet 1
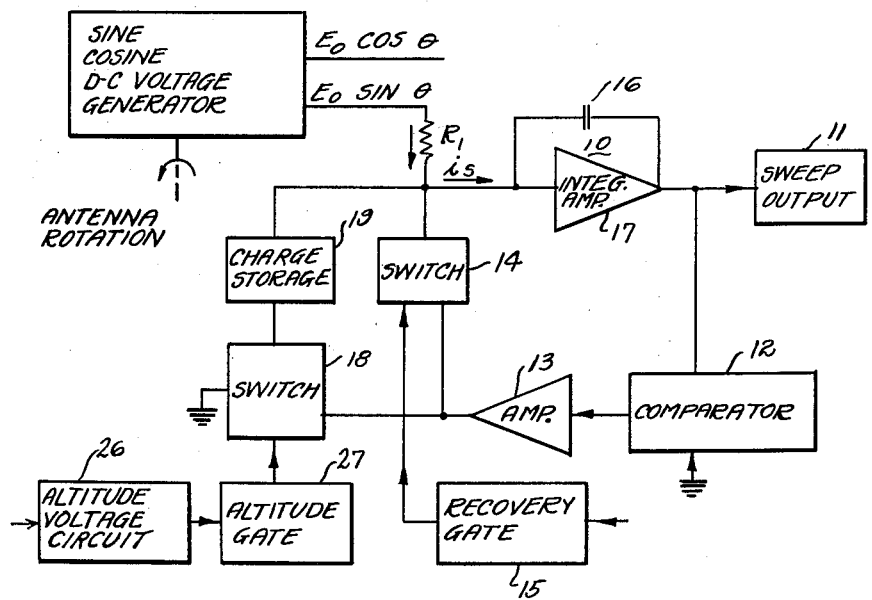
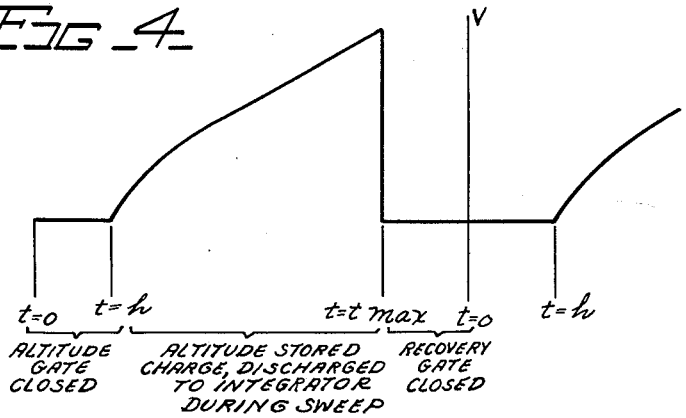
INVENTOR.
RICHARD N. CLOSE Jan. 8, 1963   R. N. CLOSE   3,072,856
SWEEP RECOVERY AND ALTITUDE COMPENSATION CIRCUIT
Filed April 15, 1958   3 Sheets-Sheet 2

INVENTOR.
RICHARD N CLOSE
BY
ATTORNEY
AGENT

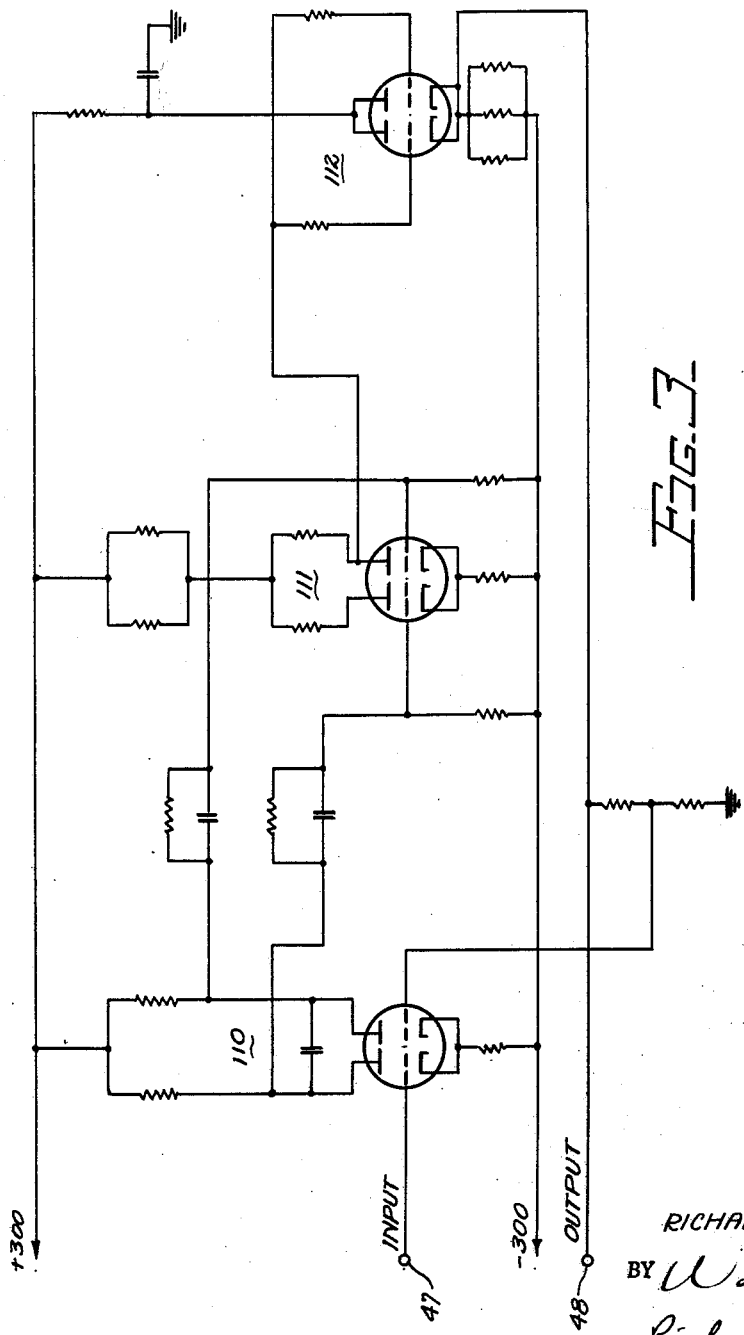

United States Patent Office 3,072,856
Patented Jan. 8, 1963

3,072,856
SWEEP RECOVERY AND ALTITUDE
COMPENSATION CIRCUIT
Richard N. Close, Garden City, N.J., assignor to the United States of America as represented by the Secretary of the Air Force
Filed Apr. 15, 1958, Ser. No. 728,752
12 Claims. (Cl. 328—185)

This invention relates to a sweep recovery and altitude compensation circuit for a plan position indicator.

One object of the invention is to provide a system wherein the sweep integrators have their outputs restored to a reference potential during the sweep recovery interval.

A further object is to provide a system for shaping the sweep to compensate for the distortion caused by the altitude of the aircraft.

These and other objects will be more fully understood from the following detailed description taken with the drawing wherein:

FIG. 1 is a block diagram of the sweep circuit according to the invention.

FIG. 3 is a circuit schematic for the integrating amplifier used in the device of FIG. 1.

FIG. 4 shows a sweep waveform with the sweep signal corrected for altitude.

Figure 2:
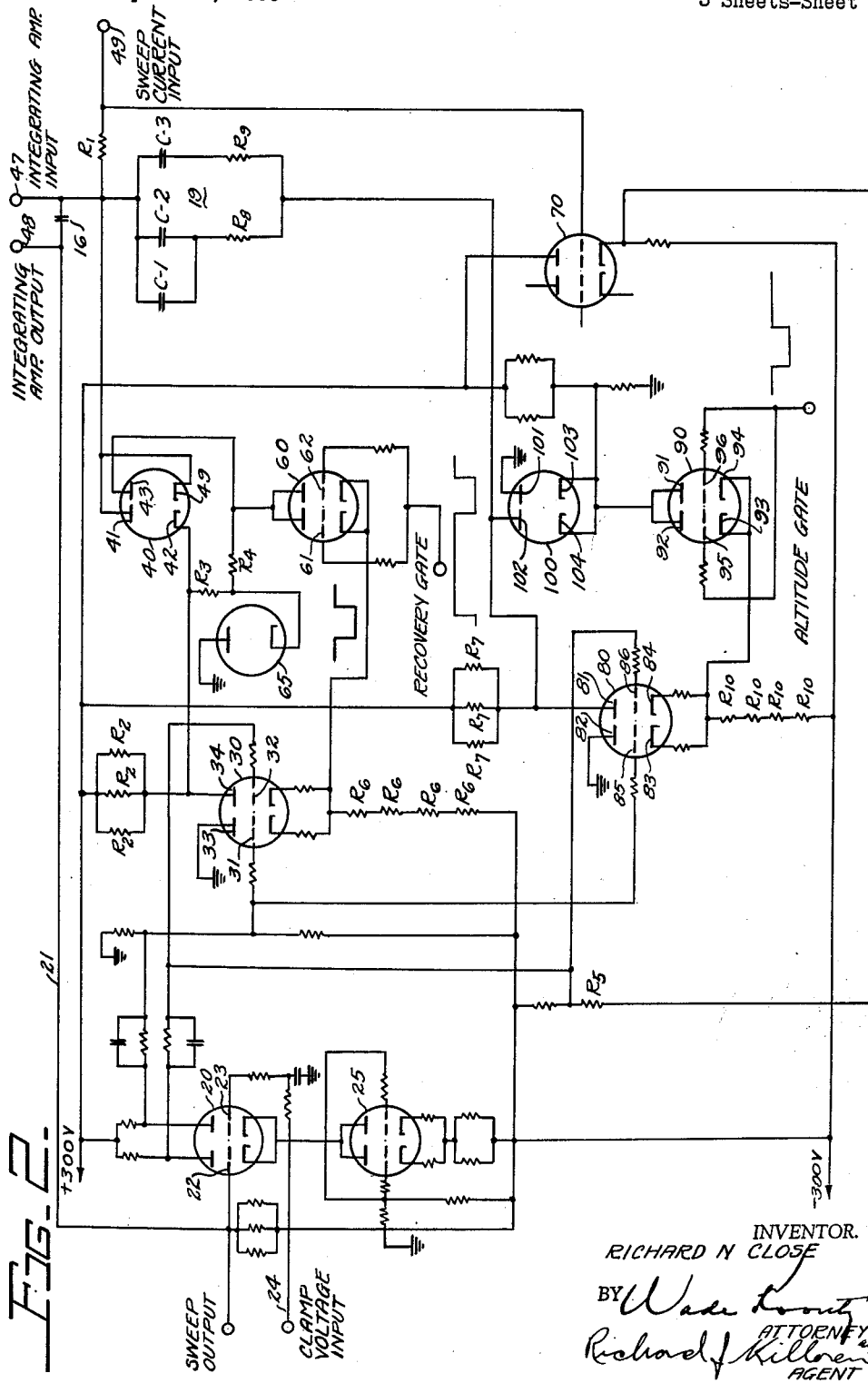
FIG. 2 is a circuit schematic for the sweep circuit of FIG. 1.

The $x$ and $y$ components of a rotating sweep are produced in $x$ and $y$ integrating amplifiers by applying charging currents thereto which are proportional to the sine and cosine of the antenna azimuth angle. The integrators have their outputs restored to a reference potential during the sweep recovery time by the action of an electronically switched feedback circuit.

To provide for charge compensation, an altitude network is provided to absorb the charging current between the time of the system trigger and the time of the first altitude return signal, instead of having this current flow into the integrating amplifier. The charge absorbed by the altitude network is returned to the integrating circuit during the sweep period to thereby produce a hyperbolic sweep.

Since the circuits for the $x$ and $y$ sweeps are identical only the circuit for the $x$ sweep will be shown and described.

Referring now to FIG. 1 of the drawing, a resolved and rectified voltage proportional to the sine of the antenna rotational angle $\theta$ is applied to the charging resistor $R_1$ and causes a current $i_s$ to flow continuously to the input of the integrating circuit 10. The output voltage of the integrating circuit must be returned to the starting reference voltage at the end of each sweep in readiness for the next trigger. The output of the integrating circuit 10 is fed to a sweep output circuit 11 and also to the comparator 12 wherein the output is compared with the reference voltage shown as ground in this case. When off-centering is used, the reference voltage is the off-centering voltage. If these two voltages differ, a current is fed through amplifier 13 and the electronic switch 14 to the input of the integrating capacitor in the integrating circuit 10. Switch 14 is closed only during the sweep recovery time by a signal from the recovery gate 15. The recovery gate signal is a positive going signal which is initiated by the end of the sweep and is terminated by the system trigger. The operation of the switch feedback circuit will be explained more fully in connection with the circuit of FIG. 2.

The output of the integrating circuit is fed to comparator tube 20 over line 21. The sweep output voltage applied to grid 22 of tube 20 must be held equal to the reference voltage applied to grid 23 over lead 24. If these two voltages differ, current is fed through amplifier 30 and the double diode 40 into the input of the integrating capacitor 16. This current discharges the integrating capacitor so that the sweep output equals the D.C. reference voltage. The three paths of the charging current for the integrating capacitor 16 are the recovery current through tube 40, sweep current through resistor $R_1$ from sweep input 49 and the altitude compensation current through altitude charge storage network 19. The resultant current of these three paths must be 0 in order for the integrating amplifier to remain at a constant output voltage. During the recovery time the current through the altitude network can be disregarded. Therefore, the recovery current must discharge the integrating capacitor and then oppose the sweep current until the system trigger occurs at which time tube 40 is cut off. The sweep output signal and the D.C. reference voltage are applied to the grids of differential amplifier 20. Because of the constant current action of the cathode load, tube 25, the voltage on the plates of tube 20 are dependent almost entirely on the difference between the two grid voltages rather than on the magnitude of these applied voltages. The total plate current of tube 20 will not change appreciably with large changes in the voltages applied to grids 22 and 23. A difference in the input voltages, however, causes a difference in the plate voltages of tubes 20 and in turn a difference in the grid voltages of tube 30 which is a second differential amplifier. Tube 30 converts this voltage difference into a recovery current that is fed to the integrating capacitor 16 with the polarity of the current depending upon the polarity of the voltage difference. At the recovery time, a recovery gate signal is applied to the grids of switching tube 60 thereby cutting off this tube. When tube 60 is cut off, tube 30 starts to conduct because of the common cathode load $R_6$ for these two tubes. If the signals applied to grids 31 and 32 are balanced, equal current will flow in the two portions of this tube thereby making the plate current in the right hand half of the tube equal to the current through resistors $R_2$ and no current will flow into the integrating capacitor 16. If grid 31 is more positive than grid 32, the plate voltage of 34 will rise and integrating capacitor current will flow through resistances $R_3$ and $R_4$ and the right hand portion of tube 40. If the grid 32 is more positive than grid 31, the plate voltage of 34 will drop and integrating capacitor current will flow in the left hand portion of tube 40. The integrating capacitor current is thus, such as to make the sweep output equal to the reference voltage in readiness for the next trigger.

As in all feedback systems, the gain is definitely limited for stability purposes. To reduce any error resulting from the limited gain of the recovery circuit, an open loop signal is applied to the grid circuit of tube 30 by means of resistor $R_5$. This signal is obtained through cathode follower 70 from resistor $R_1$ in the sweep current path. This voltage is proportional to the charging current and provides a means of directly determining the amount of current that must be supplied by the recovery circuit to cancel out the effect of the charging current.

To begin a sweep, diode 40 must be back biased so that no current can flow through it. To accomplish this, the positive recovery gate is applied to tube 60 causing it to conduct and thus causing tube 30 to be cut off because of their common cathode load. When the current flows through the parallel sections of tube 60 and through resistor $R_4$, the plate on tube 60 will attempt to swing very negative. The cathode of clamp diode 65, however, is never more negative than ground and the junction of resistors $R_3$ and $R_4$ are therefore at ground potential. Cathode 42 and plate 43 of tube 40 are then held at such a potential level as to keep tube 40 cut off until the end of the sweep at which time tube 60 is again cut off by the recovery gate.

The circuit thus far described may be modified so as to provide hyperbolic sweeps delayed so as to start at the time $t_h$ that the signal return is received from the objects directly under the aircraft. To accomplish this, a gate is needed which starts at the time of the transmitter pulse and ends at time $t_h$. The gate signal operates an electronic switch to divert current from the sweep integrator into a special altitude network until the time $t_h$ when it is allowed to discharge back into the sweep integrator. The gate signal to operate switch 18, of FIG. 1, is produced in gate circuit 27 which is controlled by altitude circuit 26. An altitude charge storage network 19 is made to absorb all the charging current $i_s$ during the time between the transmitter trigger and the first altitude return signal which is the first ground return echo received. Switch 18 enables the charge storage network 19 to absorb the charging current and then to deliver this accumulated charge back into the integrator during the sweep period in such a manner as to approximate hyperbolic sweep.

During the recovery time, tube 80 of FIG. 2 is cut off by the cathode coupling from tube 90 which is conducting. The plate current of tube 90 flows through the clamping diode 100. The plate 101 is grounded thereby providing a clamp to ground. The current flowing through plate 102 and $R_7$ holds the plate 81 of tube 80 at ground potential. This keeps the altitude network 19 discharged. When the system trigger occurs, the altitude gate applied to grids 95 and 96 of tube 90 cuts off this tube thereby allowing tube 80 to start to conduct. When tube 90 is cut off, the cathodes 103 and 104 of tube 100 rise rapidly in potential and this rise in potential cuts off tube 100 so that the altitude network is no longer clamped to ground. Since the grids of tube 30 are connected in common with the grids of tube 80, the current that was flowing through switching diode 40 in the recovery circuit now flows into the altitude network 19 charging condensers C-1, C-2 and C-3. This current cancels the sweep current flowing in resistor $R_1$ and the sweep voltage therefore remains equal to the D.C. clamp voltage for the duration of the altitude time. At the time of the first altitude return signal, the altitude gate ends thereby allowing tube 90 to start conducting, which in turn cuts off altitude compensation amplifier 80. The clamping diode 100 again clamps the altitude network to ground and allows the altitude network to discharge through the low impedance of the clamping diode 100 into the integrating amplifier thereby providing the current necessary for the altitude compensation of the sweep.

The integrating amplifier 17 connected across the condenser 16 is a high gain amplifier. This amplifier may be any high gain amplifier which satisfies the conditions for use in the Miller type integrating amplifier circuit. One such amplifier is shown in FIG. 3 wherein two differential amplifiers 110 and 111 are followed by a cathode follower 112. Degenerative feedback is applied from the output of the cathode follower 112 to the input through the integrating capacitor 16. The input voltage of the integrating amplifier remains very close to the reference voltage for large changes in the output voltage. The output voltage of the integrating amplifier is therefore proportional to the charge on the integrating capacitor. The input impedance of this circuit is extremely high and the integrating capacitor can therefore discharge only very slowly. The cathode follower stage makes the output impedance of this circuit very low so that the circuit can be loaded with no appreciable change in voltage. The output voltage is changed by introducing a charge into the input of the integrating amplifier.

There is thus provided a sweep circuit for a plan position indicator wherein the sweep integrators have their output restored to a reference potential during the sweep recovery interval and which provides a hyperbolic sweep to provide radar range altitude distortion correction.

Though one specific embodiment has been described in some detail, it is obvious that numerous changes may be made without departing from the general principles and scope of the invention.

I claim:

1. A sweep recovery circuit for a plan position indicator comprising; a sweep integrating circuit, means for applying a charging current to said sweep integrating circuit, output means connected to said sweep integrating circuit, means for comparing the output of said integrating circuit with a reference voltage, a feedback amplifier connected between the output of said comparing means and the input of said integrating circuit, a two-way electronic switch connected between said amplifier and the input of said integrating circuit, and means for gating said switch to allow a sweep recovery signal to pass from said amplifier to said integrating circuit only during the sweep recovery time.

2. A sweep recovery circuit for a plan position indicator comprising; a sweep integrating circuit, means for applying a charging current proportional to the sine of the antenna rotation angle to said sweep integrating circuit, output means connected to said sweep integrating circuit, a comparator circuit, means for applying the output of said integrating circuit to said comparator, means for applying a reference voltage to said comparator, a feedback amplifier, means for applying the difference signal of said comparator circuit to said amplifier, a two-way electronic switch connected between said amplifier and the input of said integrating circuit and means for gating said switch to allow the difference signal to pass from said amplifier to said integrating circuit only during the sweep recovery time.

3. A sweep recovery circuit for a plan position indicator comprising; a sweep integrating circuit, means for applying a charging current to said sweep integrating circuit, an output means connected to said sweep integrating circuit, a comparator circuit comprising a double triode, a constant current device connected in the cathode circuit of said double triode, means for applying the output of said sweep integrating circuit to the grid of one of said triodes, means for applying a clamp voltage to the grid of the other of said triodes whereby the current flowing in each half of said double triode is determined by the relative value of the voltages applied to said grids, a feedback amplifier, means for applying the output of said comparator to said amplifier, a two-way electronic switching circuit connected between the output of said amplifier and the input of said sweep integrating circuit, means for gating said switching circuit to allow the comparison information to pass to said sweep integrating circuit only during the sweep recovery time.

4. A sweep recovery circuit for a plan position indicator comprising; a sweep integrating circuit, means for applying a charging current to said sweep integrating circuit, an output means connected to said sweep integrating circuit, a comparator circuit comprising a double triode, a constant current device connected in the cathode circuit of said double triode, means for applying the output of said sweep integrating circuit to the grid of one of said triodes, means for applying a clamp voltage to the grid of the other of said triodes whereby the current flowing in each half of said double triode is determined by the relative value of the voltages applied to said grids, a two-way electronic switching circuit connected between the output of said comparator and the input of said sweep integrating circuit, means for applying the output of said comparison circuit to said switching circuit, means for gating said switching circuit to allow the comparson information to pass to said sweep integrating circuit only during the sweep recovery time.

5. An altitude compensation network for use in a plan position indicator which uses a system trigger as a time reference and which displays ground echo return signals comprising; a sweep integrating circuit, means for applying a charging current to said sweep integrating circuit, output means connected to said sweep integrating circuit, a charge compensation network, means for causing said system to absorb all the charging current during the time between the network trigger and the first ground echo return signal and for causing said network to return the accumulated charge back into the integrating circuit during the sweep period.

6. An altitude compensation network for use in a plan position indicator comprising; a sweep integrating circuit, means for applying a charging current to said sweep integrating circuit, output means connected to said sweep integrating circuit, a charge compensation network, a charging circuit for said charge compensation network, means for clamping said charging circuit to ground during the sweep recovery time, means for producing a gate signal which starts with the system trigger and which ends with the first ground echo return signal, means responsive to said gate signal for cutting off said clamping circuit so that the charging circuit is no longer clamped to ground whereby said charge compensation network is made to absorb all of the charging current during the time between the system trigger and the first ground echo return signal and to return the accumulated charge to the integrating circuit during the sweep period.

7. An altitude compensation network for use in a plan position indicator comprising; a sweep integrating circuit, means for applying a charging current to said sweep integrating circuit, output means connected to said sweep integrating circuit, a charge compensation network, means for producing a gate signal which begins at the time of the system trigger and which ends at the time of the first ground echo return signal, a charging circuit for said charge compensation network, means for applying said gate signal to said charging circuit whereby said charge compensation network is made to absorb all of the charging current during the time between the system trigger and the first ground echo return signal and to return the accumulated charge back into the integrating circuit during the sweep period.

8. A sweep recovery circuit for use in a plan position indicator, comprising; a sweep integrating circuit, means for applying a charging current proportional to the sine of the antenna rotation angle to said sweep integrating circuit, output means connected to said sweep integrating circuit, a comparator circuit, means for applying the output of said integrating circuit to said comparator, means for applying a reference voltage to said comparator to produce a difference signal, a feedback amplifier, means for applying said difference signal to said amplifier, an electronic switch connected between said amplifier and the input of said integrating circuit, means for gating said switch to allow the difference signal to pass from said amplifier to said integrating circuit only during the sweep recovery time, a charge compensation network, means for causing said network to absorb all of the charging current during the time between the system trigger and the first ground echo return signal and for causing said network to return the accumulated charge back into the integrating circuit during the sweep period.

9. A sweep recovery circuit for use in a plan position indicator comprising; a sweep integrating circuit, means for applying a charging current to said sweep integrating circuit, output means connected to said sweep integrating circuit, means for comparing the output of said integrating circuit with a reference voltage, a feedback amplifier connected between the output of said comparing means and the input of said integrating circuit, an electronic switch connected between said amplifier and the input of said integrating circuit, means for gating said switch to allow a sweep recovery signal to pass from said amplifier to said integrating circuit only during the sweep recovery time, a charge compensation network, means for causing said network to absorb all of the charging current during the time between the system trigger and the first ground echo return signal and for causing said network to return the accumulated charge back into the integrating circuit during the sweep period.

10. A sweep recovery circuit for use in a plan position indicator comprising; a sweep integrating circuit, means for applying a charging current to said sweep integrating circuit, an output means connected to said sweep integrating circuit, a comparator circuit comprising a double triode, a constant current device connected in the cathode circuit of said double triode, means for applying the output of said sweep integrating circuit to the grid of one of said triodes, means for applying a clamp voltage to the grid of the other of said triodes whereby the current flowing in each half of said double triode is determined by the relative value of the voltages applied to said grids, an electronic switching circuit connected between the output of said comparator and the input of said sweep integrating circuit, means for applying the output of said comparison circuit to said switching circuit, means for gating said switching circuit to allow the comparison information to pass to said sweep integrating circuit only during the sweep recovery time, a charge compensation network, means for causing said network to absorb all of the charging current during the time between the system trigger and the first ground echo return signal and for causing said network to return the accumulated charge back into the integrating circuit during the sweep period.

11. A sweep recovery circuit for use in a plan position indicator comprising; a sweep integrating circuit, means for applying a charging current to said sweep integrating circuit, an output means connected to said sweep integrating circuit, a comparator circuit comprising a double triode, a constant current device connected in the cathode circuit of said double triode, means for applying the output of said sweep integrating circuit to the grid of one of said triodes, means for applying a clamp voltage to the grid of the other of said triodes whereby the current flowing in each half of said double triode is determined by the relative value of the voltages applied to said grids, a feedback amplifier, means for applying the output of said comparator to said amplifier, an electronic switching circuit connected between the output of said amplifier and the input of said sweep integrating circuit, means for gating said switching circuit to allow the comparison information to pass to said sweep integrating circuit only during the sweep recovery time, a charge compensation network, a charging circuit for said charge compensation network, means for clamping said charging circuit to ground during the sweep recovery time, means for producing a gate signal which starts with the system trigger and which ends with the first ground echo return signal, means responsive to said gate signal for cutting off said clamping circuit so that the charging circuit is not clamped to ground during the time of said gate whereby said charge compensation network is made to absorb all of the charging current during the time between the system trigger and the first ground echo return signal and to return the accumulated charge to the integrating circuit during the sweep period.

12. A sweep recovery circuit for use in a plan position indicator comprising; a sweep integrating circuit, means for applying a charging current to said sweep integrating circuit, an output means connected to said sweep integrating circuit, a comparator circuit comprising a double triode, a constant current device connected in the cathode circuit of said double triode, means for applying the output of said sweep integrating circuit to the grid of one of said triodes, means for applying a clamp voltage to the grid of the other of said triodes whereby the current flowing in each half of said double triode is determined by the relative value of the voltages applied to said grids, an electronic switching circuit connected between the output of said comparator and the input of said sweep integrating circuit, means for applying the output of said comparison circuit to said switching circuit, means for gating said switching circuit to allow the comparison information to pass to said sweep integrating circuit only during the sweep recovery time, a charge compensation network, a charging circuit for said charge compensation network, means for clamping said charging circuit to ground during the sweep recovery time, means for producing a gate signal which starts with the system trigger and which ends with the first ground echo return signal, means responsive to said gate signal for cutting off said clamping circuit so that the charging circuit is not clamped to ground during the time of said gate whereby said charge compensation network is made to absorb all of the charging current during the time between the system trigger and the first ground echo return signal and to return the accumulated charge to the integrating circuit during the sweep period.

References Cited in the file of this patent
UNITED STATES PATENTS

| | | |
|---|---|---|
| 2,458,367 | Fyler et al. | Jan. 4, 1949 |
| 2,533,251 | Hill | Dec. 12, 1950 |
| 2,611,126 | Irving | Sept. 16, 1952 |
| 2,809,326 | Gulnac | Oct. 8, 1957 |
| 2,852,717 | McCurdy | Sept. 16, 1958 |
| 2,854,575 | Richardson | Sept. 30, 1958 |
| 2,855,510 | Goldberg | Oct. 7, 1958 |
| 2,856,526 | Merrill | Oct. 14, 1958 |
| 2,880,412 | Matthews | Mar. 31, 1959 |
| 2,929,956 | Jacobs et al. | Mar. 22, 1960 |